Sept. 21, 1954 O. J. POUPITCH Re. 23,876

SPRING CLIP FOR MOLDING STRIPS AND THE LIKE

Original Filed Sept. 1, 1948 2 Sheets-Sheet 1

INVENTOR.
Ouglješa Jules Poupitch
BY
Moore, Olson & Fredler
Attys

SPRING CLIP FOR MOLDING STRIPS AND THE LIKE
Original Filed Sept. 1, 1948 2 Sheets-Sheet 2
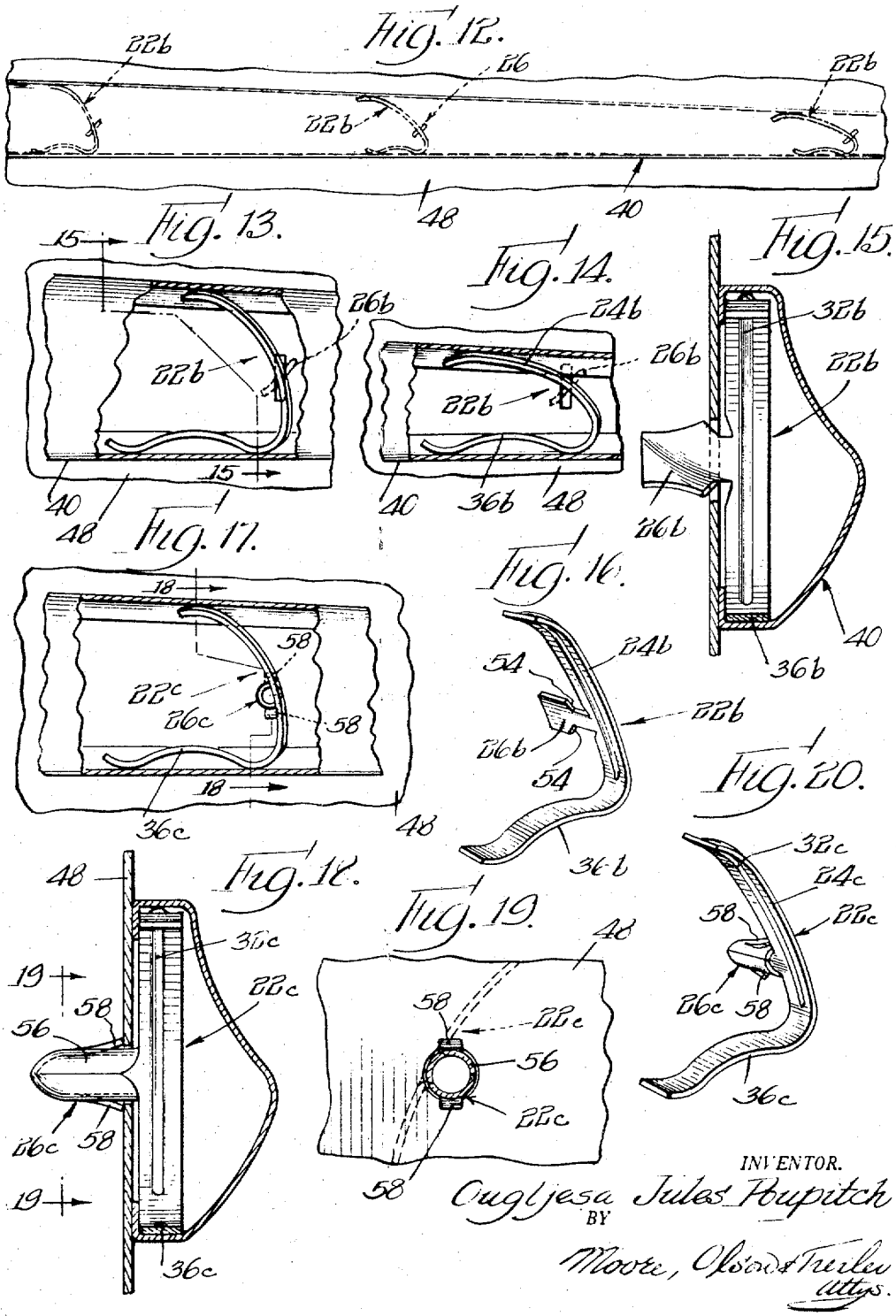
INVENTOR.
Ouglješa Jules Poupitch
BY
Moore, Olson & Turley
attys.

Reissued Sept. 21, 1954

Re. 23,876

UNITED STATES PATENT OFFICE 23,876

SPRING CLIP FOR MOLDING STRIPS AND THE LIKE

Ougljesa Jules Poupitch, Chicago, Ill., assignor to Illinois Tool Works, Chicago, Ill., a corporation of Illinois Original No. 2,515,895, dated July 18, 1950, Serial No. 47,245, September 1, 1948. Application for reissue April 2, 1951, Serial No. 218,871

7 Claims. (Cl. 24—73)

Matter enclosed in heavy brackets [ ] appears in the original patent but forms no part of this reissue specification; matter printed in italics indicates the additions made by reissue.

This invention relates generally to fastening devices capable of being used to secure molding strips and the like in place.

Various types of clips have heretofore been employed to secure molding strips in place. These fasteners are usually designed to accommodate a given width of molding strip and are adapted for use only with a strip of given width. It has also been common practice heretofore in securing tapered molding strips to employ different sizes of clips to fit within correspondingly varying widths of the strip. It is an important object of the present invention to provide an improved fastener or clip of extremely simple, inexpensive construction which is self-adjustable to accommodate molding strips of various widths.

More specifically, the invention contemplates improved fasteners of the type referred to above equipped with a yieldable portion for engaging one wall of a molding strip, and an arcuate margin for engaging the opposite molding wall, the yieldable portion of the fastener serving to accommodate itself to moldings of various widths.

It is a further object of the present invention to provide fasteners or clips of the type referred to above in which the shank portion accommodated by the aperture in the supporting work structure or panel is either a separate element, such as a screw member having a sheet metal body or head secured thereto, or a shank formed integral with and extending laterally from said sheet metal body portion.

Another object of the present invention is to provide a molding clip which, when mounted within a molding, is constantly urged by a spring member into transverse strutting position with respect to the opposite walls of the molding strip.

*A further object of the invention, in its more specific aspects, is to provide a molding clip of the type defined which, apart from the aforementioned shank portion, is constructed of a single piece of stock, whereby to minimize fabrication costs, and enhance uniformity and reliability in operation.*

*Another object of the invention is to provide a molding clip, of the type defined, wherein a single resilient arm is provided in combination with the clip body portion, said single arm and body cooperating to hold the clip to the associated work parts, such for example as a molding strip, throughout a range in size and type of such work parts with which the clip is to be associated.*

*Another object of the invention is to provide a molding clip structure which, apart from the aforementioned shank portion, is relatively flat and thus adaptable for shallow molding strips and the like; the clip head and associated parts lying essentially in a common plane providing a relatively flat structure of wide adaptability to different types and kinds of molding strips.*

A still further object of the present invention is to provide a fastener for molding strips and the like which is so designed that the axis of the shank portion thereof will occupy the same spaced relation with respect to one wall of the molding strip, regardless of variations in overall width of the strip, this being extremely important in applications requiring apertures in supporting structures or panels to be formed along a straight line.

The present invention also contemplates a fastener for molding strips capable of being inserted from one end of the molding and forced into the tapered portion of such a molding, the fastener being self-adjustable to accommodate itself to the change in molding width, thereby enabling a series of fasteners to be distributed within the tapered section of the molding at selected spaced intervals corresponding wiith the spacing of the apertures in the supporting work structure or panel.

The foregoing and other objects and advantages will be more apparent from the following detailed description when considered in connection wiith the accompanying drawings, wherein—

Fig. 1 is an elevational view of a tapered molding strip showing the application thereto of the fasteners contemplated by the present invention;

Figs. 2, 3 and 4, respectively, are enlarged elevational views of the three clips and their associated molding structure shown in Fig. 1;

Figure 7:
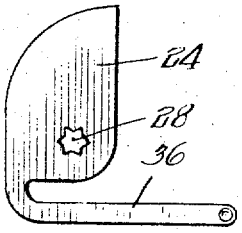
Figure 8:
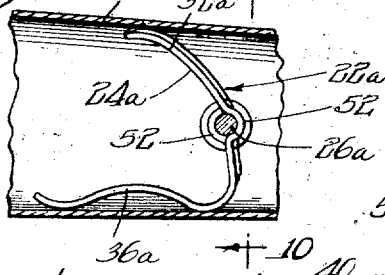
Figure 10:
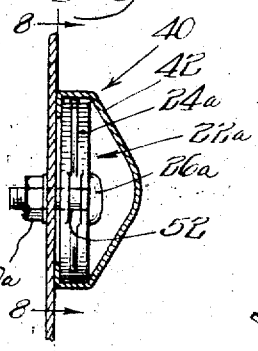
Figure 11:
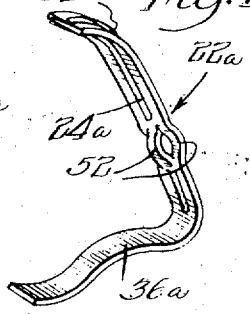
Figure 9:
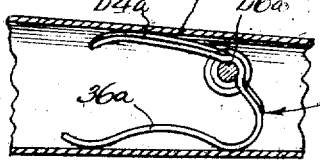

Fig. 7 discloses the blank from which the molding clip is formed;

Fig. 8 discloses an elevational view of a modified clip operatively associated with a molding strip;

Fig. 9 is a view similar to Fig. 8 illustrating the use of the same molding clip for a molding strip of less width;

Fig. 10 is a transverse sectional view taken substantialy along the line 10—10 of Fig. 8;

Fig. 11 is a perspective view of the sheet metal portion of the molding [clips] *clip* illustrated in Figs. 9 and 10;

Fig. 12 is a side elevational view of a tapered molding strip having in operative association therewith molding clips of modified form equipped with a shank adapted to be twisted for securing the clip in place;

Figs. 13 and 14, respectively, are enlarged elevational views of two of the molding clips shown in Fig. 12;

Fig. 15 is an enlarged transverse sectional view taken substantially along the line 15—15 of Fig. 13;

Fig. 16 is a perspective view of the sheet metal clip of Figs. 12 to 15, inclusive, detached from the molding strip;

Fig. 17 is a view similar to Fig. 13, illustrating a molding clip of still further modified form equipped with an integral shank adapted to be snapped into the aperture of a supporting structure;

Fig. 18 is an enlarged transverse sectional view taken substantially along the line 18—18 of Fig. 17;

Fig. 19 is a fragmentary elevational view taken from the left of Fig. 18; and

Fig. 20 is a perspective view of the clip of Figs. 18 and 19 detached from the molding strip.

Referring now to the drawings more in detail wherein like numerals have been employed to designate similar parts throughout the various figures, it will be seen in Figs. 1 to 7, inclusive, that one embodiment of the invention is shown in the molding clip designated generally by the numeral 22. This clip 22 includes a body portion or head 24 and a screw member 26 staked to said head portion. This staking is accomplished by forming an aperture 28 in the body 24, as shown in Fig. 7, which accommodates the shank of the screw 26. The portion of the shank adjacent the screw head is formed with complementary splines or peripheral projections which register with the V-shaped peripheral notches of the aperture 28. After the body 24 and screw member 26 have been telescopically associated, the projecting extremities of the splines are upset or staked so as to provide abutments 30, Fig. 5. These abutments or shoulders 30 cooperate with the head of the screw 26 in securing the two parts together as a unit. The splined coupling of the screw shank with the body 24 serves to prevent relative rotation of the parts. It will also be noted that the body or head 24 is provided with suitable strengthening ribs 32. The outer margins of the body 24 extend laterally so as to provide a flange 34.

Figure 6:
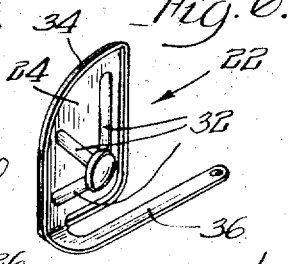
Fig. 6 is a perspective view of the clip detached from the molding.

Formed integral with one margin of the body or head 24 is a spring arm 36. As illustrated in Fig. 7, this arm 36 is first stamped from flat stock and then bent laterally of the body 24, as illustrated in Fig. 6. The free extremity of the arm 36 is provided with a detent 38 to reduce frictional resistance to shifting of the clip within a molding strip 40, as will more clearly appear from the description which is to follow.

Figure 1:
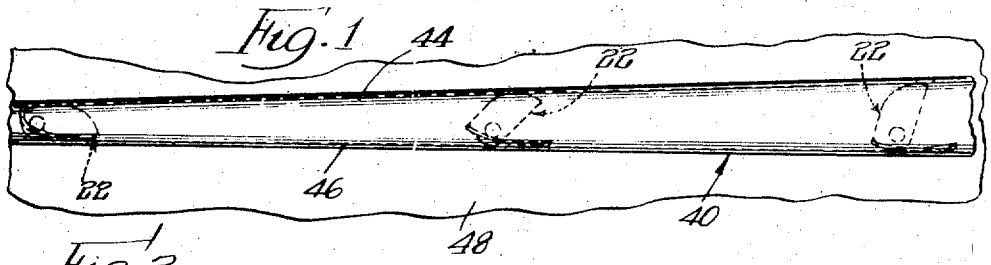
Figure 2:
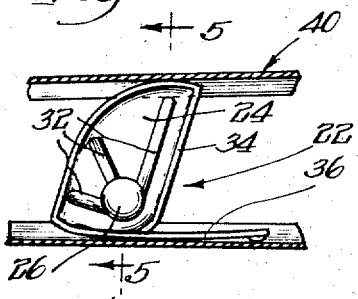
Figure 3:
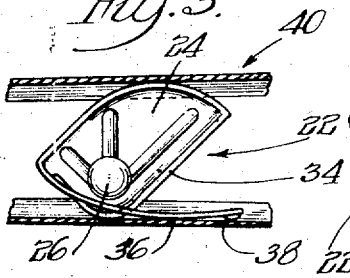
Figure 4:
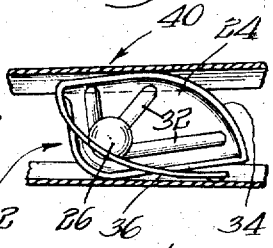
Figure 5:
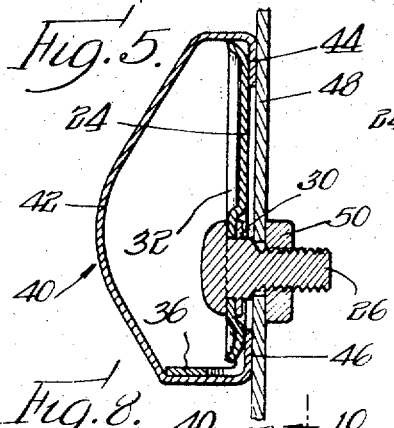
Fig. 5 is an enlarged transverse sectional view taken substantially along the line 5—5 of Fig. 2.

The molding strip 40 illustrated in Fig. 1 tapers in width from the smaller extremity at the left of Fig. 1 to the larger extremity at the right. This molding strip is more clearly illustrated in cross-section in Fig. 5, and it will be seen that it incorporates an arcuate body portion 42 which terminates along its margins in inwardly extending flanges 44—46. In initially applying the clip it is introduced from the right end of the molding strip of Fig. 1 with the spring arm occupying the position illustrated in Fig. 2. The clip is then slid along the molding strip until it reaches the position at the left of Fig. 1. At this point the clip occupies the position as illustrated in Fig. 4. Attention is directed to the fact that as the clip is initially inserted within the molding strip, the free extremity of the spring arm 36 engages the lower wall portion of the strip and an arcuate portion of the flange 34 engages the opposite wall of the strip. That is to say, the spring arm 36 functions to constantly maintain contact between the arcuate portion of the flange 34 and the upper wall of the strip 40. As the clip is moved from right to left of Fig. 1, the body 24 experiences a rotative movement in a clockwise direction in order to accommodate itself automatically to the decrease in width of the molding strip. Likewise, the spring arm 36 experiences greater flexing. This relationship continues until the arm and body occupy the relative positions illustrated in Fig. 4. It is of particular interest to note that regardless of the location of the clip 22 within the molding strip 40, the distance of the axis of the screw 26 from the lower wall of the molding remains constant. This is due to the fact that the portion of the flange 34 adjacent the screw is provided with a radius struck from the center of the screw. Hence, regardless of the annular disposition of the head 24 within the molding strip, the distance between the screw 26 and the lower molding strip wall will remain constant. This feature of construction is singularly important in instances where the apertures within the supporting work part, as, for example, the apertures within the supporting panel 48, Fig. 5, are located along a straight line. It is quite common in the fabrication of automobiles to arrange the screw accommodating apertures in the work in this manner.

In Fig. 1 a portion of the molding strip is illustrated which requires the use of at least three clips. After the clips have been properly located, the threaded shanks of the screws 26 are telescopically associated with their complementary apertures in the work and a nut 50 is applied to each screw. As the nut is finally tightened against the surface of the supporting panel 48 of Fig. 5, the clip body or head portion 24 along its upper area clampingly engages the flange 44 and the lower portion of the clip clampingly engages the flange 46. Thus the molding strip is firmly held in position against the supporting work sheet. Any tendency for the clip body 24 to rotate during the final tightening of the nut 50 will result in a camming action between the upper arcuate or cam surface of the flange 34 against the complementary upper wall of the molding strip. Thus the tendency would be for the clip head to become more firmly wedged between the upper and lower wall portions of the molding strip. Any tendency for the body or head portion 24 to rotate in the opposite direction (clockwise as viewed in Fig. 3) is offset by the resilient action of the arm 36.

It should also be understood that clips of the type just described are not limited for use in tapered molding strips, but lend themselves readily for use in non-tapering strips. In this connection it is of particular interest to note that the above described clips are capable of being used with molding strips of various widths. That is to say, a clip of a given size may be employed with equal facility on molding strips of different widths. Although Figs. 2 to 4, inclusive, illustrate the adaptation of the same clip to various widths of a tapered strip, it will be equally clear that such clips may be used with strips of varied widths having parallel side walls.

In Figs. 8 to 11, inclusive, a modified form of clip is illustrated, this clip being designated generally by the numeral 22a. This clip 22a comprises a single strip of elongated sheet stock which is struck out intermediate its ends, providing wall portions 52 defining a screw receiving aperture. The aperture defined by these wall portions 52 may be slightly smaller than the external diameter of the screw threads, thereby causing firm impingement of the wall portions with the screw threads when the screw is forcibly inserted in the aperture. This screw is designated by the numeral 26a. One portion of the clip 22a comprises a body 24a provided with a strengthening rib 32a for the purpose of lending rigidity thereto. The opposite portion of the clip is provided with a resilient arm 36a of undulated form.

It will be apparent that the clip 22a may be inserted within the molding strip 40 in the same way that the previously described clip 22 is inserted. In Fig. 8 the clip 22a is illustrated as having been initially inserted from the left of the strip 40 with the resilient finger 36a engaging the lower wall of the molding strip, and the free extremity of the rigid portion or body 24a engaging the upper wall of the strip. Fig. 9 illustrates the relative position of the rigid and resilient portions of the clip when the clip is positioned within a molding strip of more restricted width. Like the clip 22, the clip 22a is automatically adjustable for use with molding strips of varying widths. The frictional engagement of the thread convolutions of the screw 26a serves to secure the parts against relative rotative and axial movement. Also, any tendency for the nut 50a to cause rotation of the clip within the molding strip will increase the wedging or strutting action of the body 24a between the upper and lower walls of the molding strip.

In Figs. 12 to 16, inclusive, still another modified form of the clip is illustrated. This clip is designated generally by the numeral 22b. Like the clip 22a, the clip 22b is formed from a single sheet of elongated strip stock. The clip 22b differs only from the clip 22a in that it employs a twistable shank 26b in place of the screw member 26a. Various parts of the clip 22b have been designated by numerals similar to those used in connection with the description of the clip 22a, except that the suffix b has been added in place of the suffix a. The clip 22b may be inserted within the molding 40 in the manner previously described, and when it has been properly located and the shank 26b telescopically associated with the complementary aperture in the supporting panel, it is only necessary to impart a twist to the shank, thereby causing oppositely disposed cam surfaces 54 to engage the wall defining the aperture in the supporting part. This serves to clamp the clip against the upper and lower flanges of the molding strip. By the use of the twistable shank 26b, the necessity of employing separate fastener members, such as screws, is eliminated.

In Figs. 17 to 20, inclusive, a still further modified form of clip designated generally by the numeral 22c is illustrated. This clip 22c is similar in every respect to the previously described clips 22a and 22b except that a modified shank portion 26c is employed. This shank portion 26c is formed integral with the remaining portion of the clip stock and comprises a snap-in type fastener incorporating a tubular body portion 56 and resilient oppositely disposed struck out arms 58. As the clip shank 26 is brought into registration with the aperture of the supporting panel, these arms 58 eventually spring outwardly so as to secure the clip and panel associated therewith against unwarranted removal from the supporting sheet. In instances where it is not necessary to employ threaded fastening members, such as screws, the snap-in type fastener shank 26c provides a very efficiently operable, inexpensive fastening structure.

In all of the modifications disclosed herein the work engaged cam surface of the head and the oppositely disposed work engaging surface of the arm are relatively yieldable. Likewise, in all of these forms the arm extends at an acute angle with respect to any straight line drawn coincident with the shank axis and a point on the work engaging surface of the head. That is to say, the above mentioned lines diverge with respect to each other as they extend away from the shank and the included angle is less than ninety degrees. By having these parts so disposed, they cooperate when clamped between opposed work surfaces, such as the oppositely disposed walls of the molding strip, to urge the margin of the head into tighter engagement with its complementary wall of the molding strip. That is to say, by having the arm and head relatively yieldable, the action of the arm is such as to tend rotatably to urge the head into a more firm locking engagement with the wall of the molding strip. While the resilient arm in all of the modifications tends to urge the work engaging or cam surface of the head into tighter engagement with one wall of the molding strip, the opposite extremity of the head bears against the opposite wall of the molding strip. Hence, the head portion is maintained in strutting engagement between the opposed walls of the molding strip, the arcuate cam surface on one side of the stud engaging one wall and the circular or arcuate surface on the opposite side of the shank engaging the opposite wall.

It will also be apparent that in all of the modifications disclosed herein the resilient arm extends substantially tangential with respect to the stud, and furthermore, the work engaging surface of the cam is such that it varies in distance from the shank axis. By having this variation in radii, the work engaging surface of the head cooperates with the spring in assuring a tight strut-like fit between the opposed walls of the molding strip. In instances where it may be desirable, this cam surface at the head may be roughened to increase the frictional aggressiveness of this surface with respect to its complementary wall of the molding strip.

It will be apparent from the foregoing description that the invention contemplates a clip of extremely simple and practical construction. The structural form of the clip is such as to enable it to be produced from flat sheet metal stock, and also enables it to be produced in a plastic mold. While one form of the [modification] *modifications* embodies a two-part construction, other forms embody a one-piece construction, thereby reducing the number of constituent parts to a minimum. *While the shank portion of the clip may thus be integral or separate, as desired, it is to be noted that preferably, and in the preferred*

*forms illustrated, the body and arm portions of the clip structure are of integral one piece construction. This facilitates fabrication of the clip, and minimizes variations and difficulty in assembly. It also promotes uniformity and reliability in operation.*

*It is further to be noted that the results of the invention are accomplished by the provision of a single arm in combination with the clip body, the single arm and body cooperating, when in assembled position, in a manner so as to resiliently effect their separation, and so as to maintain the arm and body firmly yet resiliently in engagement with the associated work parts. The provision of a single arm and body combination further reduces assembly costs and simplifies the structure, and provides for simplicity and reliability in operation.*

*In each of the several forms provided it will be noted that the head portion of the clip is relatively flat, and that the head and resilient arm lie substantially in a common plane, thus providing a clip structure which, apart from the securing shank, is substantially flat and thus adaptable to a wide variety of molding strips including strips which are relatively shallow in their structure and of small internal clearance.*

While for purposes of illustration the invention has been described for use in securing molding strips in place, it will be understood that the invention is not limited to such use, but contemplates application in many instances where oppositely disposed surfaces or walls must be engaged in order to secure a head or body portion in position. That is to say, the invention contemplates the use of the relatively yieldable head and arm arrangement, combined with a lateral member such as a shank portion in a wide range of applications. The scope of the invention, therefore, should not be limited to the specific disclosures and applications illustrated herein, but should be limited only by the scope of the appended claims.

I claim:

[1. A spring clip including a head for traversing the space between opposed surfaces of a channeled work piece, a peripheral bearing section on the head for engaging one work surface, an oppositely disposed peripheral bearing section for engaging said other work surface when said head is rotated to a given position and a spring arm secured at one end to and extending from said head, the free portion of said arm adapted to engage one of the aforesaid work surfaces to rotatably urge said peripheral bearing sections into work engaging position.]

[2. A spring clip in accordance with claim 1, wherein the head portion is provided with fastener means for mounting said clip on a supporting work piece.]

[3. A spring clip in accordance with claim 2, wherein the fastener means is rotatable as a unit with the head.]

[4. A spring clip in accordance with claim 1, wherein the head portion is provided with fastener means including a thread helix, said helix when rotatably urged in a tightening direction tending to rotatably urge said peripheral bearing sections into work engaging position.]

[5. A spring clip in accordance with claim 1, wherein a fastener element in the form of a shank extends axially from one side of said head.]

[6. A spring clip for use with channel-shaped members, as for example molding strips having inturned flanges, comprising a head having major and minor transverse axes, said head being insertable between the opposed inturned flanges of a companion channel-shaped member when the minor axis of said head is transversely presented therebetween, the major axis of said head being greater in length than the distance between the aforesaid inturned flanges, and a spring arm extending from said head having a bearing surface on its free extremity for engaging a surface of the molding strip to rotatably urge the major axis of said head into overlying relation with respect to said inturned flanges.]

[7. A spring clip in accordance with claim 6, wherein the head is provided with peripheral oppositely disposed bearing sections for engaging complementary opposed surfaces of a channel-shaped member when said head is rotated to a given position.]

[8. A spring clip for use with channel-shaped members comprising a head member having oppositely disposed peripheral work engaging bearing surfaces, at least one of which constitutes a cam surface, and a spring arm secured at one end to and extending from said head, the free portion of said arm being adapted to engage a work surface to rotatably urge said peripheral bearing sections into work engaging position.]

[9. A spring clip in accordance with claim 8, wherein the head is provided with fastener means having an axis extending transversely of the head which is equidistant from the peripheral bearing section of the head oppositely disposed from the peripheral section constituting a cam surface.]

*10. A spring clip for use with channel-shaped members comprising a head member having oppositely disposed peripheral work engaging bearing surfaces, at least one of which constitutes a cam surface, said head member being rotatable about an axis substantially normal to a plane which includes said peripheral bearing surfaces, a spring arm secured at one end to and extending beyond the outer margin of said head, the free portion of said arm being yieldably shiftable in a plane substantially parallel to the aforesaid plane and adapted to engage a work surface to rotatably urge said peripheral bearing surfaces into work engaging position, and fastener means associated with said head member for mounting said clip in its position of rotation on a supporting work piece, said fastener means having an axis extending transversely of the head which is equidistant from the peripheral bearing surface of the head oppositely disposed from the peripheral surface constituting a cam surface.*

*11. A spring clip for use with channel members, as for example molding strips having inturned flanges, comprising a substantially flat generally rigid plate-like member having major and minor transverse axes, said plate member being insertable between the opposed inturned flanges of a complementary channel member when the minor axis of said plate member is presented transversely therebetween, the major axis of said plate member being greater in length than the distance between the aforesaid inturned flanges, opposite extremities of said plate-like member being adapted for strut-like wedging between opposed side walls of said channel member when said plate member is rotated in a given direction, a spring arm supported by said plate member and having a bearing surface in the vicinity of its free extremity extending beyond the outer periphery of said plate member when said arm is in its normal unflexed position, said bearing surface adapted to*

*bear against one of the aforesaid side walls so as to urge said plate member rotatably into strutting relation with said opposed side walls, said arm being resiliently shiftable in a plane substantially parallel to the plane of said plate member, and fastener means non-rotatable with respect to and projecting from said plate member for accommodating a work piece upon which the channel member is to be mounted.*

*12. A spring clip for use with channel members as set forth in claim 11, wherein the resilient arm extends from a marginal portion of the plate-like member spaced from those opposed marginal portions of said plate member adapted to engage the opposed side walls of the channel member.*

*13. A spring clip for use with channel members as set forth in claim 11, wherein at least one of the marginal portions of the plate-like member adapted to engage a side wall of the channel member constitutes a cam surface to facilitate the strutting relation of the plate member in various positions depending upon the spacing of the side walls of the channel member.*

*14. A spring clip for use with channel members as set forth in claim 11, wherein said spring arm includes a flexible portion between said plate-like member and said free extremity to permit movement of said free extremity about an axis substantially normal to the plane of the plate member.*

*15. A spring clip for use with channel members as set forth in claim 11, wherein portions of the plate member are displaced out of the plane thereof to provide reenforcement for said plate member.*

*16. A spring clip for use with channel members as set forth in claim 11, wherein a marginal section of the plate member extends out of the plane of said member and provides the support for the spring arm.*

References Cited in the file of this patent or the original patent

UNITED STATES PATENTS

| Number | Name | Date |
|---|---|---|
| 2,144,885 | McFadden | Jan. 24, 1939 |
| 2,192,344 | Fernberg | Mar. 5, 1940 |
| 2,212,150 | VanUum | Sept. 10, 1940 |
| 2,221,124 | Wiley | Nov. 12, 1940 |
| 2,254,310 | Place | Sept. 2, 1941 |
| 2,450,306 | Sickles | Sept. 28, 1948 |
| 2,473,400 | Waara | June 14, 1949 |
| 2,531,351 | Churchill | Nov. 21, 1950 |
| 2,531,352 | Churchill | Nov. 21, 1950 |